United States Patent
Shin et al.

(10) Patent No.: US 10,866,636 B2
(45) Date of Patent: Dec. 15, 2020

(54) VIRTUAL TOUCH RECOGNITION APPARATUS AND METHOD FOR CORRECTING RECOGNITION ERROR THEREOF

(71) Applicants: VTouch Co., Ltd., Seoul (KR); Hyundai Motor Company, Seoul (KR); Kia Motors Corporation, Seoul (KR)

(72) Inventors: Hee Won Shin, Gyeonggi-do (KR); Dong Woo Kim, Gyeonggi-do (KR); Sang Woo Ji, Gyeonggi-do (KR); Seok Joong Kim, Seoul (KR)

(73) Assignees: VTouch Co., Ltd., Seoul (KR); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/182,909

(22) Filed: Nov. 7, 2018

(65) Prior Publication Data

US 2019/0163268 A1    May 30, 2019

(30) Foreign Application Priority Data

Nov. 24, 2017   (KR) .................. 10-2017-0158175

(51) Int. Cl.
*G06F 3/01* (2006.01)
*B60K 37/06* (2006.01)
(Continued)

(52) U.S. Cl.
CPC .............. *G06F 3/013* (2013.01); *B60K 37/00* (2013.01); *B60K 37/06* (2013.01); *G06F 3/017* (2013.01);
(Continued)

(58) Field of Classification Search
CPC ........ G06F 3/013; G06F 3/017; G06F 3/0416; G06F 3/0488; H04N 13/204; B60K 37/00;
(Continued)

(56) References Cited

U.S. PATENT DOCUMENTS

2012/0206333 A1    8/2012   Kim
2013/0321347 A1    12/2013  Kim
(Continued)

FOREIGN PATENT DOCUMENTS

KR    10-1151962 B1    6/2012
KR    10-1235432 B1    2/2013
(Continued)

*Primary Examiner* — Stella Higgs
(74) *Attorney, Agent, or Firm* — Mintz Levin Cohn Ferris Glovsky and Popeo, P.C.; Peter F. Corless (57) ABSTRACT

A virtual touch recognition apparatus and a method of correcting a recognition error of the virtual touch recognition apparatus utilize a user's eye position and an image display position or projection position of a head-up display (HUD). The virtual touch recognition apparatus includes a gesture recognizer detecting the eye position of a user, the head-up display projecting an image on the image display position in front of the user, and a controller correcting a recognition error of a virtual touch based on the eye position of the user and the image display position. The apparatus and method can minimize a virtual touch recognition error occurring depending on the user's eye position and the image display position of the HUD when gesture control technology using the virtual touch is applied to a vehicle.

16 Claims, 10 Drawing Sheets

(51) Int. Cl.
*B60K 37/00* (2006.01)
*H04N 13/383* (2018.01)
*G06F 3/0484* (2013.01)

(52) U.S. Cl.
CPC ....... *G06F 3/04842* (2013.01); *H04N 13/383* (2018.05); *B60K 2370/111* (2019.05); *B60K 2370/1464* (2019.05); *B60K 2370/155* (2019.05); *B60K 2370/1529* (2019.05); *B60K 2370/334* (2019.05)

(58) Field of Classification Search
CPC .... B60K 37/02; B60K 37/06; B60K 2370/111
See application file for complete search history.

(56) References Cited

U.S. PATENT DOCUMENTS

| | | | |
|---|---|---|---|
| 2014/0160012 A1* | 6/2014 | Su | G06F 3/005 345/156 |
| 2014/0184499 A1 | 7/2014 | Kim | |
| 2014/0200080 A1 | 7/2014 | Kim | |
| 2015/0116204 A1 | 4/2015 | Kim | |
| 2015/0135144 A1 | 5/2015 | Kim | |
| 2015/0145830 A1 | 5/2015 | Kim | |
| 2016/0132126 A1* | 5/2016 | van Laack | G06F 3/0304 345/156 |
| 2016/0179205 A1* | 6/2016 | Katz | G06F 3/013 345/156 |
| 2017/0075427 A1 | 3/2017 | Kim | |
| 2018/0173318 A1 | 6/2018 | Kim et al. | |

FOREIGN PATENT DOCUMENTS

| | | |
|---|---|---|
| KR | 10-1272458 B1 | 6/2013 |
| KR | 10-1321274 B1 | 11/2013 |
| KR | 10-1334585 B1 | 12/2013 |
| KR | 10-1343748 B1 | 1/2014 |
| KR | 10-1364133 B1 | 2/2014 |
| KR | 10-1381928 B1 | 4/2014 |
| KR | 10-1441882 B1 | 9/2014 |
| KR | 10-1533319 B1 | 7/2015 |
| KR | 10-1533320 B1 | 7/2015 |
| KR | 10-1611898 B1 | 4/2016 |
| KR | 10-1754126 B1 | 7/2017 |

* cited by examiner

| DRIVER'S EYE HEIGHT \ HUD IMAGE HEIGHT | 1 | 2 | 3 | ~ | 10(REFERENCE) | ~ | 19 | 20 |
|---|---|---|---|---|---|---|---|---|
| 780mm | +18mm | +19mm | +20mm | ~ | +30mm | ~ | +40mm | +41mm |
| 790mm | +8mm | +9mm | +10mm | ~ | +20mm | ~ | +30mm | +31mm |
| ~ | ~ | ~ | ~ | ~ | 0 | ~ | ~ | ~ |
| 850mm(REFERENCE) | ~ | ~ | ~ | ~ | ~ | ~ | ~ | ~ |
| 910mm | −32mm | −31mm | −30mm | ~ | −20mm | ~ | −10mm | −9mm |
| 920mm | −42mm | −41mm | −40mm | ~ | −30mm | ~ | −20mm | −19mm |

※ REFERENCE VALUE (10TH STEP, EYE HEIGHT) : HUD DESIGN INFORMATION USE

VIRTUAL TOUCH RECOGNITION APPARATUS AND METHOD FOR CORRECTING RECOGNITION ERROR THEREOF

CROSS-REFERENCE TO RELATED APPLICATION

This application claims under 35 U.S.C. § 119(a) the benefit of Korean Patent Application No. 10-2017-0158175, filed on Nov. 24, 2017 in the Korean Intellectual Property Office, the entire contents of which are incorporated by reference herein.

BACKGROUND

(a) Technical Field

The present disclosure relates to a virtual touch recognition apparatus capable of correcting a recognition error of a virtual touch depending on a user's eye position and/or an image display position of a head-up display when a virtual touch technology is applied to a vehicle in conjunction with the head-up display, and a method for correcting the recognition error of the virtual touch recognition apparatus.

(b) Description of the Related Art

A head-up display is a display apparatus that is designed to present information useful to a driver of a vehicle on a windshield of the vehicle. That is, the head-up display projects information displayed in an instrument cluster, such as current speed and fuel level of the vehicle, and route information of a navigation unit, onto the windshield as a virtual image. Since the head-up display provides the information within a driver's viewing range to minimize the user's gaze shift, the head-up display does not distract the driver, thereby ensuring safety while driving.

In order to prevent the driver from being distracted as the head-up display operates, a virtual touch (a gesture control) recognition technology may be incorporated into a vehicle. The virtual touch recognition technology recognizes a position of the virtual touch by sensing the movement of driver's eye or hand using a 3D camera and controls the instruments, such as a navigation unit and/or an air conditioning system, etc., based on the recognized virtual touch.

In a case in which the virtual touch recognition technology is applied to the vehicle in conjunction with the head-up display, recognition errors may occur in recognizing the user's virtual touch since the position of the virtual image of the head-up display image viewed by the driver changes depending on the position of the driver's eyes or the display position of the head-up display image.

SUMMARY

An aspect of the present disclosure provides a virtual touch recognition apparatus capable of correcting a recognition error of a virtual touch depending on a user's eye position and/or an image display position of a head-up display when applying a virtual touch technology in conjunction with the head-up display and a method for correcting the recognition error of the virtual touch recognition apparatus.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a virtual touch recognition apparatus includes a gesture recognizer detecting an eye position of a user, a head-up display projecting an image on an image display position in front of the user, and a controller correcting a recognition error of a virtual touch based on the eye position of the user and the image display position.

The head-up display projects the image on a windshield of a vehicle, which is located in front of the user.

The gesture recognizer includes an image camera taking an image of the user and a spatial coordinate calculator analyzing the image obtained by the image camera and calculating the eye position of the user and a finger position of the user.

The image camera is implemented by a three-dimensional camera.

The spatial coordinate calculator calculates spatial coordinates of a center position of the user's eye and spatial coordinates of an end position of the user's finger with respect to a center of a front wheel of the vehicle.

The controller calculates a virtual touch position based on the eye position of the user and the finger position of the user, which are output from the gesture recognizer.

The controller determines a correction amount depending on the eye position and the image display position with reference to a look-up table stored in a memory.

The controller corrects coordinates of a control object in the image projected by the head-up display.

The control object is a graphic object assigned with a specific function.

The controller re-corrects the coordinates of the control object with reference to the look-up table when at least one of the eye position of the user or the image display position is changed after the coordinates of the control object is corrected.

According to another aspect of the present disclosure, a method of correcting a recognition error of a virtual touch recognition apparatus includes detecting an eye position of a user using an image camera, obtaining a position of an image projected in front of the user from a head-up display, and correcting a recognition error of a virtual touch based on the eye position and the position of the projected image.

The head-up display projects the image on a windshield of a vehicle, which is located in front of the user.

The detecting of the eye position of the user includes obtaining a user image through a three-dimensional camera and analyzing the obtained user image to calculate spatial coordinates of a center position of the eye of the user.

The detecting of the eye position of the user includes calculating the spatial coordinates of the center position of the eye of the user using a three-dimensional coordinate calculation method.

The detecting of the eye position of the user includes calculating the spatial coordinates of the center position of the eye of the user with respect to a center of a front wheel of the vehicle.

The detecting of the eye position of the user includes calculating spatial coordinates of an end position of a finger of the user using the obtained user image.

The correcting of the recognition error of the virtual touch includes correcting a position of a control object in the projected image.

The control object is implemented by a graphic object assigned with a specific function.

The method further includes re-correcting the position of the control object with reference to a look-up table when at least one of the eye position of the user or the position of the projected image is changed after the recognition error of the virtual touch is corrected.

The correcting of the recognition error of the virtual touch includes determining a correction amount depending on the eye position and the position of the projected image with reference to a look-up table.

According to the present disclosure, since the position of the control object in the image projected by the head-up display is corrected depending on the eye position of the user when the virtual touch technology is applied in conjunction with the head-up display, the virtual touch position may be more accurately recognized.

In addition, according to the present disclosure, since the position of the control object in the image projected by the head-up display is corrected depending on the image display position of the head-up display when the virtual touch technology is applied in conjunction with the head-up display, the recognition error of the virtual touch may be reduced.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure is provided to minimize a virtual touch recognition error occurring depending on a driver's eye position and a display position (i.e., a projection position) of a head-up display (HUD) when a gesture control technology using virtual touch is applied to a vehicle in conjunction with the HUD.

Figure 1:
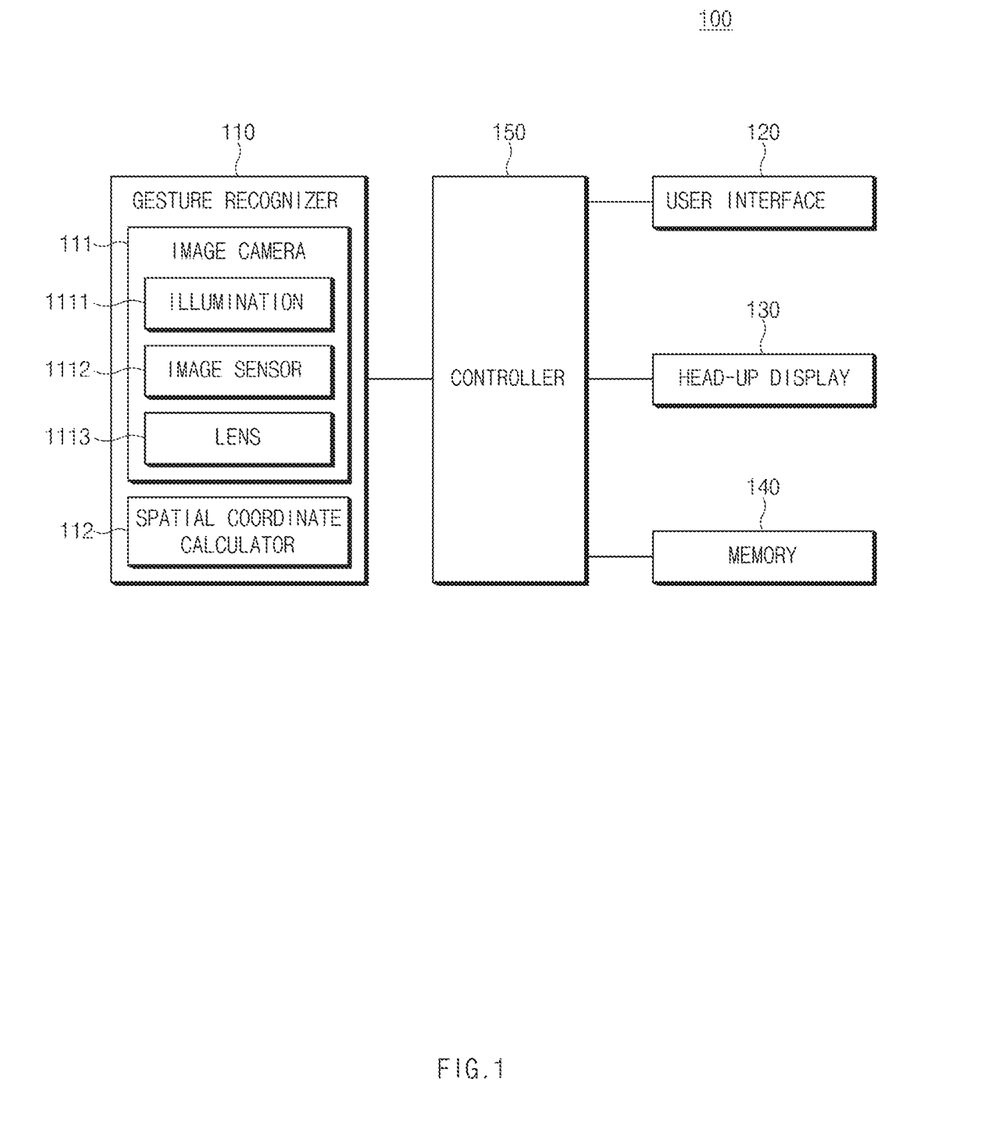
FIG. 1 is a block diagram showing a virtual touch recognition apparatus according to an exemplary embodiment of the present disclosure.
Figure 2A:
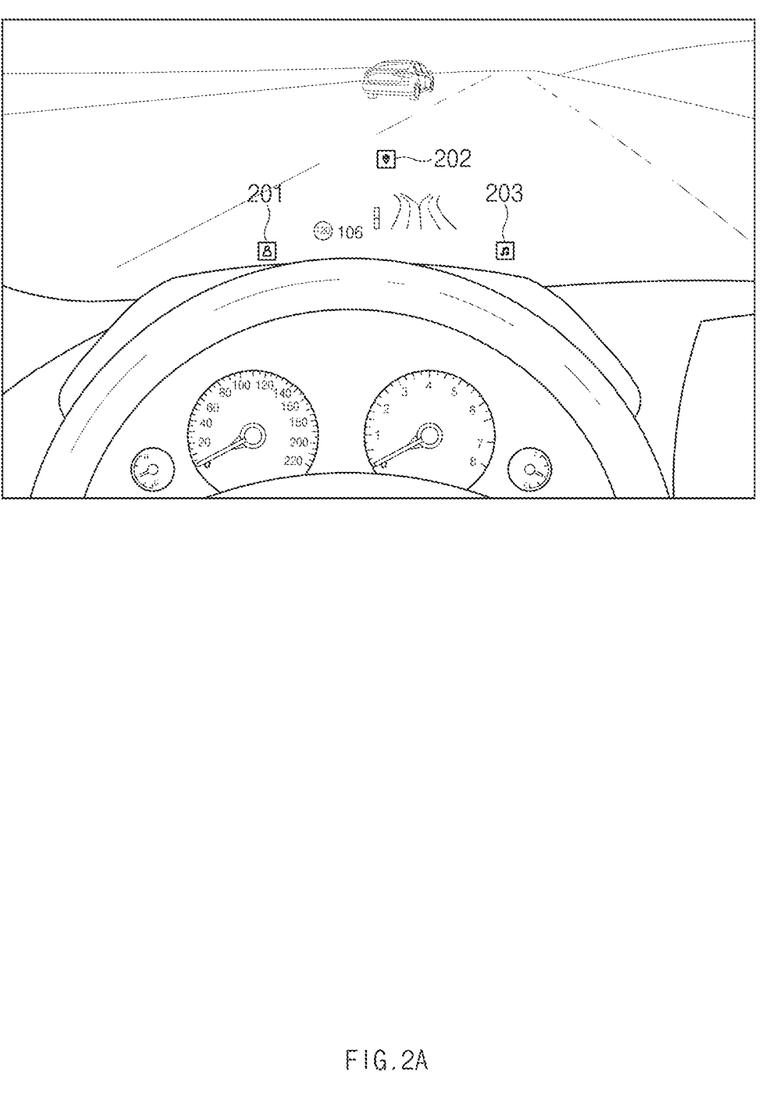
FIGS. 2A and 2B are views showing images projected by a head-up display according to an exemplary embodiment of the present disclosure.
Figure 2B:
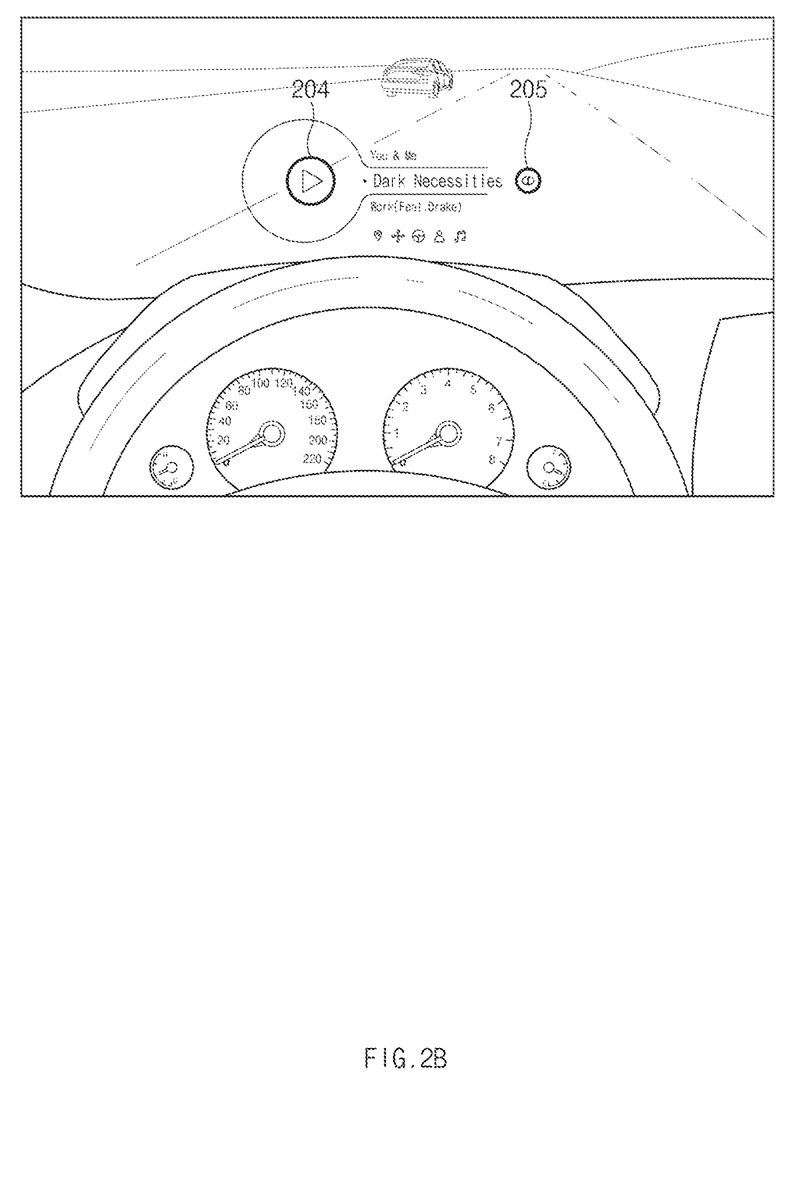
Figure 3:
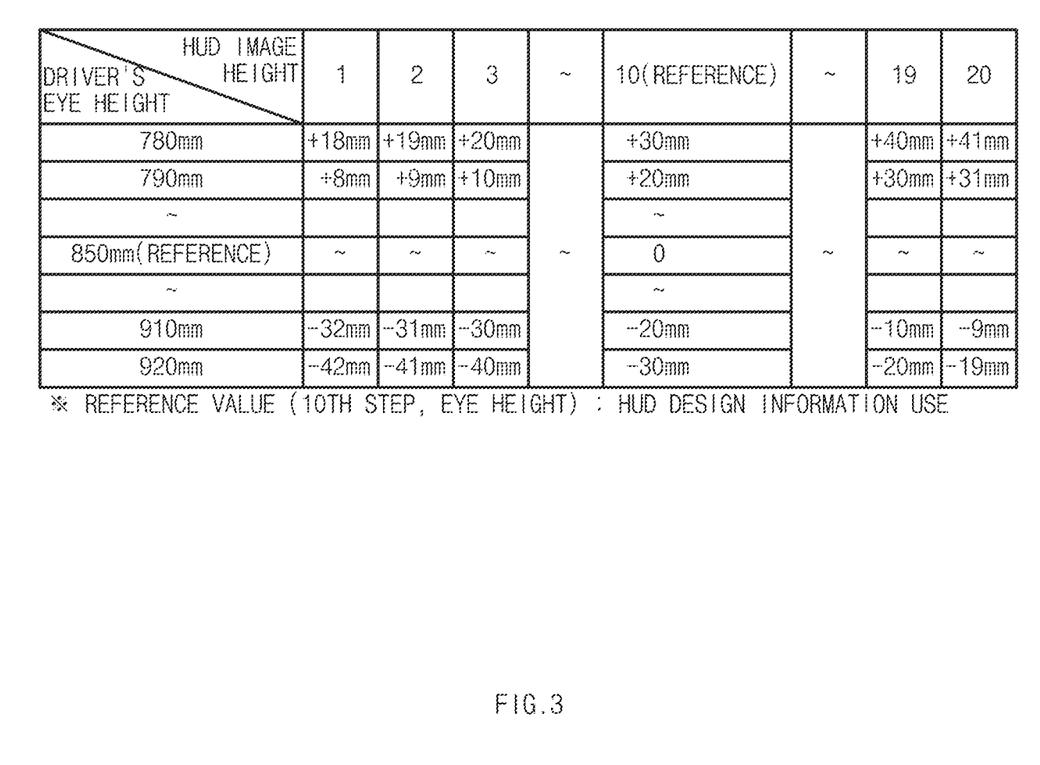
FIG. 3 is a look-up table for correcting a virtual touch according to an exemplary embodiment of the present disclosure.
Figure 4:
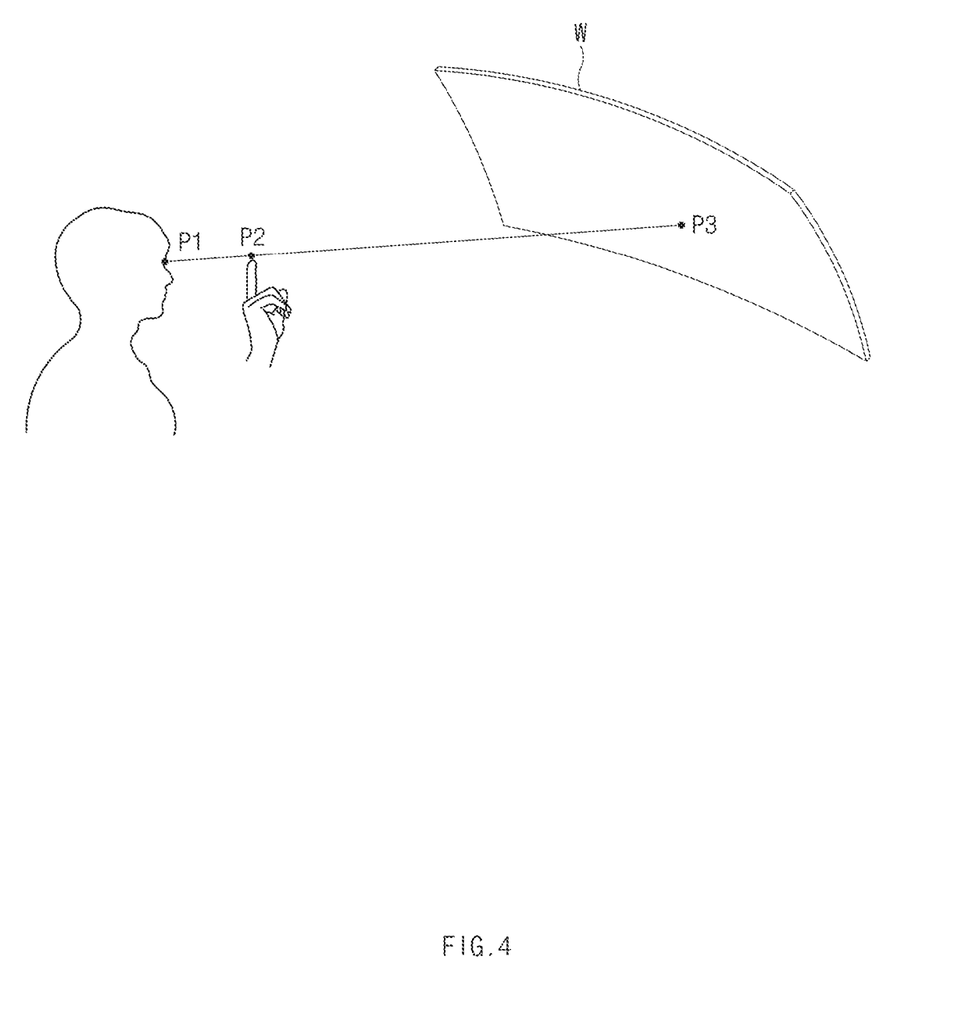
FIG. 4 is a view schematically depicting a method of calculating a virtual touch position according to an exemplary embodiment of the present disclosure.
Figure 5A:
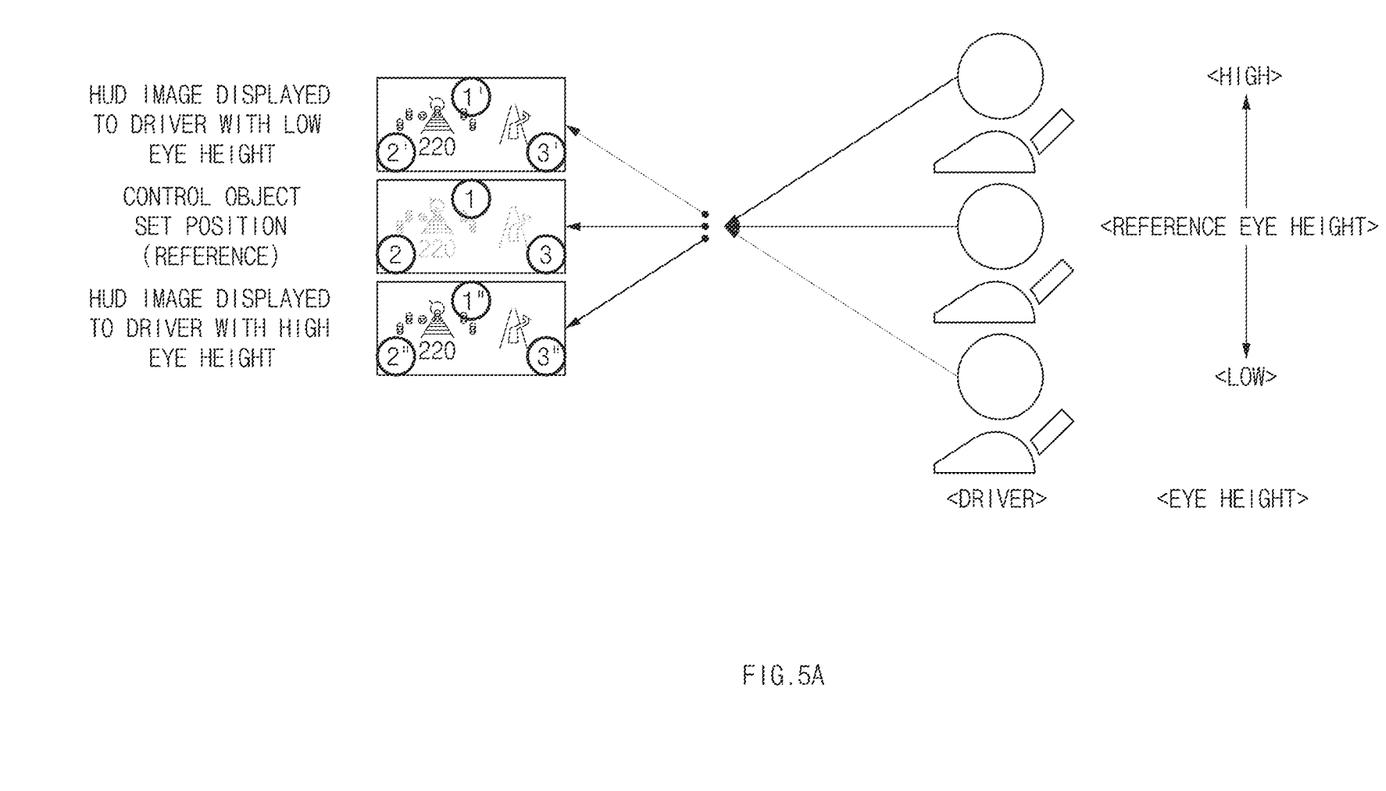
FIGS. 5A and 5B are views schematically depicting a virtual touch recognition error depending on an eye position and an image display position according to an exemplary embodiment of the present disclosure.
Figure 5B:
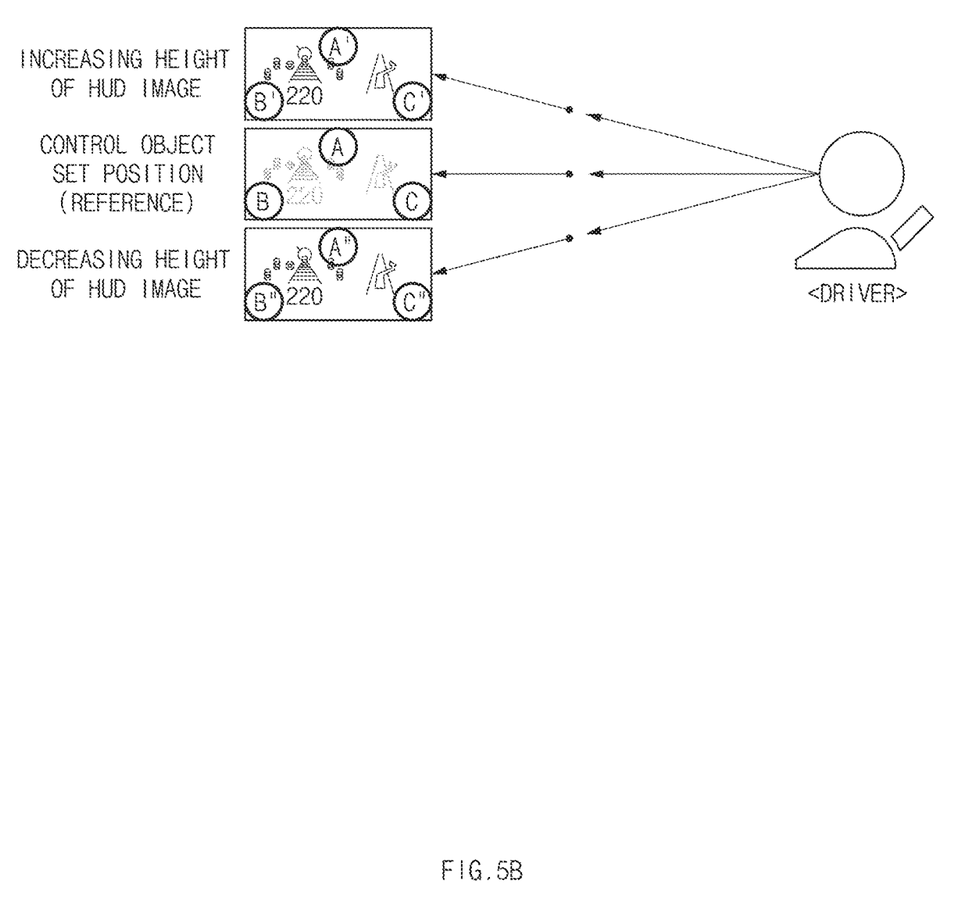

FIG. 1 is a block diagram showing a virtual touch recognition apparatus 100 according to an exemplary embodiment of the present disclosure, FIGS. 2A and 2B are views showing images projected by a head-up display according to an exemplary embodiment of the present disclosure, FIG. 3 is a look-up table for correcting a virtual touch according to an exemplary embodiment of the present disclosure, FIG. 4 is a view schematically depicting a method of calculating a virtual touch position according to an exemplary embodiment of the present disclosure, and FIGS. 5A and 5B are views schematically depicting a virtual touch recognition error depending on an eye position and an image display position according to an exemplary embodiment of h the present disclosure.

As shown in FIG. 1, the virtual touch recognition apparatus 100 according to the present disclosure includes a gesture recognizer 110, a user interface 120, a head-up display 130, a memory 140, and a controller 150.

The gesture recognizer 110 recognizes a gesture input by a user (e.g., a driver). The gesture recognizer 110 includes an image camera 111 and a spatial coordinate calculator 112.

The image camera 111 is installed in front and inside of the vehicle to face the user, and the image camera 111 takes a picture of the user (i.e., a user image). The image camera 111 may be a three-dimensional (3D) camera, which is able to obtain a depth distance, and may be implemented by one of a time-of-flight (TOF) camera, a stereo camera, and a structured light camera.

The image camera 111 may include an illumination unit 1111, an image sensor 1112, and a lens 1113.

The illumination unit 1111 emits a light to the user. The illumination unit 1111 may be implemented by one or more infrared light emitting diodes (IR LEDs) or laser diodes. In addition, the illumination unit 1111 may project a specific pattern, e.g., a speckle pattern, toward the user.

The image sensor 1112 obtains the user image on which the specific pattern is projected. The image sensor 1112 transmits the obtained image to the spatial coordinate calculator 112 and/or the controller 150. The image sensor 1112 may store the obtained image in the memory 140.

The image sensor 1112 may be implemented by at least one image sensor of image sensors, such as a charge-coupled device (CCD) image sensor, a complementary metal oxide semiconductor (CMOS) image sensor, a charge priming device (CPD) image sensor, a charge injection device (CID) image sensor, etc.

As an example, the image camera 111 may include a 3D image sensor or a depth image sensor and may selectively (optionally) include at least one color image sensor.

The lens 1113 may include at least one lens of a standard lens, a super wide angle lens, a wide angle lens, a zoom lens, a close-up lens, a fisheye lens, or a semi-fisheye lens.

The image camera 111 may include an image processor that performs various image processing processes, e.g., a noise removal process, a color reproduction process, an image quality and chroma control process, a file compression process, etc., on the image obtained by the image sensor 1112.

The spatial coordinate calculator 112 may calculate 3D coordinates (spatial coordinates) of a body (e.g., eye, finger, etc.) of the user using one of known 3D coordinate detection methods. As the 3D coordinate detection method, an optical triangulation method or a time delay measurement method may be representatively used. The optical triangulation method calculates a 3D position of an object by projecting a structural light beam pattern to the object using a beam projector, taking an image of the object, on which the structured light beam pattern is projected, using a camera, and using the image taken by the camera.

The time delay measurement method calculates the 3D position by calculating a time of flight (TOF) of a laser, an infrared ray, or an ultrasonic wave, which reaches a receiver after being generated by a transmitter and reflected by the object, and using the calculated TOF.

The spatial coordinate calculator 112 analyzes the user image obtained through the image camera 111 to recognize the user's eye and finger. The spatial coordinate calculator 112 calculates positions of the recognized user's eye and finger. The spatial coordinate calculator 112 calculates a center position of the eye (spatial coordinates of the center of the eye) and an end position of the finger (spatial coordinates of the end of the finger) with respect to a center of a front wheel of the vehicle.

The spatial coordinate calculator 112 may include a processor (not shown) and a memory (not shown). In this case, the processor (not shown) may include at least one of image processors, an application specific integrated circuit (ASIC), a digital signal processor (DSP), programmable logic devices (PLD), field programmable gate arrays (FPGAs), a central processing unit (CPU), microcontrollers, or microprocessors.

The user interface 120 generates input data in response to a user's operation. In addition, the user interface 120 may generate a signal that instructs "ON" or "OFF" of the virtual touch recognition apparatus 100. The user interface 120 may include at least one of various input devices, such as a key pad, a dome switch, a touch pad (resistive/capacitive), a toggle switch, a jog wheel, a jog switch, etc.

The head-up display 130 is installed on a dashboard of the vehicle to project various information on a windshield of the vehicle as a virtual image. The various information may include route information, a driving speed, a fuel level, a check control message, a control object, a user interface (UI), a graphic user interface (GUI), etc. A special plastic film is disposed between an outer plate glass of the windshield and an inner plate glass of the windshield to prevent a ghost image from occurring.

As an example, the head-up display 130 displays the driving speed of the vehicle, the route information of a navigation, the control objects (graphic icons or visual indicators) 201 to 203 assigned with specific instructions, and control icons 204 and 205 of a multimedia player on the windshield of the vehicle as shown in FIGS. 2A and 2B.

The head-up display 130 includes a projection display, a backlight, and a reflector. The projection display may be implemented by one of a liquid crystal display (LCD), a thin film transistor-liquid crystal display (TFT-LCD), an organic light emitting diode (OLED) display, and a flexible display.

The backlight operates as a background illumination of the projection display and substantially simultaneously generates a light required for a brightness of the head-up display 130. The backlight is an LED-array configured to include a green LED and a red LED. The reflector reflects the information (graphic image) displayed through the projection display to the windshield.

The head-up display 130 outputs a display position of the image (i.e., an image display position), which is presently displayed, to the controller 150. In particular, the image display position (i.e., an image projection position) means spatial coordinates of a position at which a center of the image projected onto the windshield of the vehicle is located with respect to reference coordinates.

The memory 140 may store software programmed to allow the controller 150 to perform a predetermined operation and may temporarily store input/output data. The memory 140 may store image data taken by the image camera 111.

In addition, the memory 140 stores a look-up table for correcting the virtual touch. The look-up table includes correction values (i.e., correction amounts) in a height direction and/or a width (breadth) direction of the vehicle depending on the eye position of the user and the image display position.

As an example, the look-up table includes the correction values in the height direction of the vehicle depending on a driver's eye height and a display height of the HUD image with respect to a reference eye height and a reference image display height. As shown in FIG. 3, when the eye height is about 850 mm and the image display height is a tenth step, the correction value is zero (0). When only the eye height is changed to about 790 mm from about 850 mm, the correction value in the height direction of the vehicle is about +20 mm.

The memory 140 may be installed inside and/or outside the controller 150. The memory 140 may be implemented by at least one storage medium among storage media, such as a flash memory, a hard disk, a secure digital (SD) card, a random access memory (RAM), a read only memory (ROM), a web storage, etc.

The controller 150 controls an overall operation of the virtual touch recognition apparatus 100. The controller 150 may include at least one of an application specific integrated circuit (ASIC), a digital signal processor (DSP), programmable logic devices (PLD), field programmable gate arrays (FPGAs), a central processing unit (CPU), microcontrollers, or microprocessors.

The controller 150 calculates a virtual touch position (i.e., virtual touch coordinates) using the eye position (i.e., first spatial coordinates) and the finger position (i.e., second spatial coordinates) of the user. Referring to FIG. 4, the controller 150 calculates a contact point at which a straight line connecting the first spatial coordinates P1 to the second spatial coordinates P2 makes contact with a display surface (reflective surface) on which the virtual image projected on the windshield W is displayed as a virtual touch position (i.e., virtual touch coordinates P3).

The controller 150 obtains the eye position of the user and the image display position from the gesture recognizer 110 and the head-up display 130. The controller 150 corrects the coordinates of the control object in the image displayed through the windshield of the vehicle by the head-up display 130 based on the eye position and the image display position, which are obtained to correct the virtual touch position. In this case, the controller 150 corrects the coordinates of the control object with reference to the look-up table. The control object may be assigned with the specific instructions and/or functions and implemented in the graphic icons or visual indicators. The coordinates of the control object means spatial coordinates of a position of the control object on the windshield on which the virtual image is projected by the head-up display 130.

When at least one position of the user's eye position or the image display position is changed to more than a reference value (e.g., a radius of about 5 mm) after the coordinates of the control object are corrected, the controller 150 re-corrects the coordinates of the control object with reference to look-up table.

The controller 150 calculates the virtual touch position based on the user's eye position and finger position output from the gesture recognizer 110 after correcting the coordinates of the control object. The controller 150 performs the function assigned to a corresponding control object when the calculated virtual touch position coincides with the corrected coordinates of the control object.

As an example, in a case in which the position of the control object assigned with the specific function (instruction) in the HUD image is set to 1, 2, and 3 as shown in FIG. 5A, the HUD image is displayed lower than the reference image display height to the driver when the driver is taller than average or the seat position is adjusted to be higher such that the eye height of the driver is higher than the reference eye height. Accordingly, when the driver inputs the virtual touch, the recognition error in which the controller 150 recognizes the position (i.e., coordinates) of the control object as 1", 2", and 3" occurs.

Meanwhile, when the driver is shorter than average or the seat position is adjusted to be lower such that the eye height of the driver is lower than the reference eye height, the HUD image is displayed higher than the reference image display height to the driver. Accordingly, when the controller 150 recognizes the virtual touch (gesture), the controller 150 misrecognizes the position (coordinates) of the control object as 1', 2', and 3'.

In addition, as shown in FIG. 5B, in a case in which the position of the control object in the HUD image is set to A, B, and C, when the driver adjusts the height of the HUD image and the display height of the HUD image becomes higher than the reference image display height, the recognition error in which the controller 150 recognizes the position (coordinates) of the control object as A', B', and C' occurs even though the driver selects the control object A, B, and C through the virtual touch.

Meanwhile, in a case in which the driver adjusts the HUD image display height to be lower than the reference image display height, the controller 150 recognizes the position (coordinates) A, B, and C of the control object as A", B", and C" when the driver inputs the virtual touch.

As described above, in order to correct the recognition error occurring when the driver's eye height and/or the display height of the HUD image are different from the references, the controller 150 identifies the driver's eye position and the display height of the HUD image and corrects the position (coordinates) of the control object based on the correction amount (correction value) corresponding to the identified eye position and the display height of the HUD image with reference to the look-up table.

For instance, when the driver's eye height becomes higher, the virtual touch recognition apparatus 100 corrects the predetermined position 1, 2, and 3 of the control object to 1", 2", and 3", respectively, with reference to the look-up table, and when the driver's eye height becomes lower, the virtual touch recognition apparatus 100 corrects the predetermined position 1, 2, and 3 of the control object to 1', 2', and 3', respectively, with reference to the look-up table.

Meanwhile, when the driver adjusts the display height of the HUD image to be higher than the reference image display height, the virtual touch recognition apparatus 100 corrects the position A, B, and C of the control object to A', B', and C' with reference to the look-up table, respectively, and when the driver adjusts the display height of the HUD image to be lower than the reference image display height, the virtual touch recognition apparatus 100 corrects the position A, B, and C of the control object to A", B", and C" with reference to the look-up table, respectively.

As described above, since the position (coordinates) of the control object is corrected based on the driver's eye position and the display height of the HUD image, the virtual touch recognition apparatus 100 may accurately recognize the virtual touch input by the user.

Figure 6:
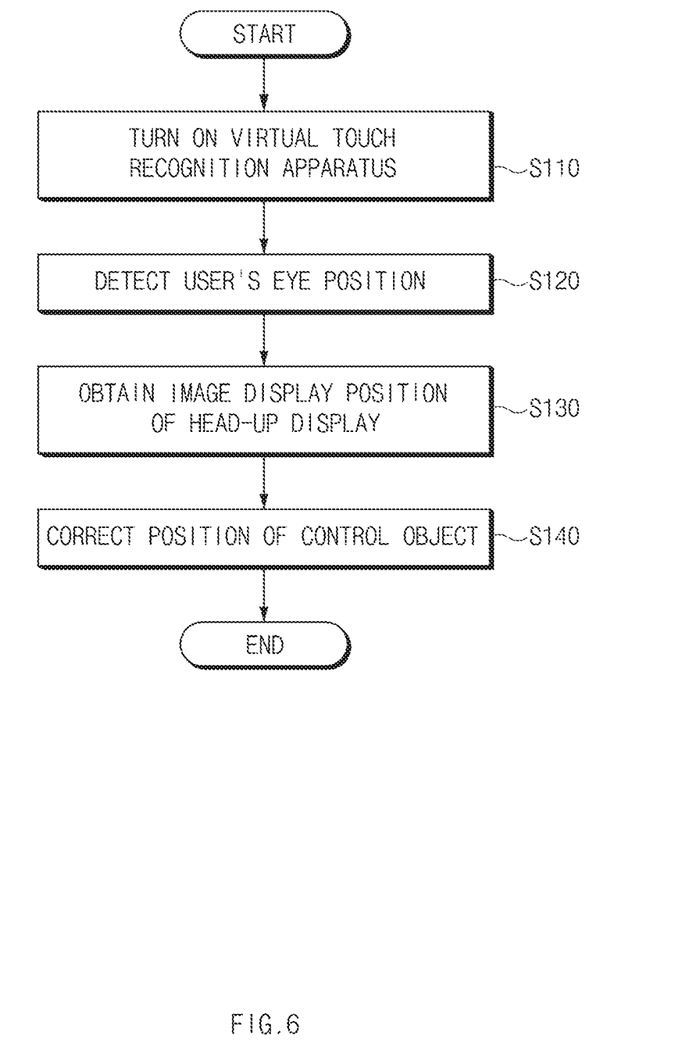
FIG. 6 is a flowchart showing a method for correcting a recognition error of a virtual touch recognition apparatus according to an exemplary embodiment of the present disclosure.

FIG. 6 is a flowchart showing a method for correcting a recognition error of a virtual touch recognition apparatus according to an exemplary embodiment of the present disclosure.

Referring to FIG. 6, the controller 150 of the virtual touch recognition apparatus 100 turns on the virtual touch recognition apparatus 100 in response to instructions output from the user interface 120 (S110).

When the virtual touch recognition apparatus 100 is turned on, the controller 150 detects the driver's eye position through the gesture recognizer 110 (S120). The gesture recognizer 110 controls the image camera 111 depending on the control by the controller 150 to obtain the user image. The spatial coordinate calculator 112 of the gesture recognizer 110 calculates the spatial coordinates of the center position of the user's eye using the user image obtained through the image camera 111. The gesture recognizer 110 transmits the spatial coordinates of the center position of the user's eye calculated by the spatial coordinate calculator 112 to the controller 150.

The controller 150 obtains the present image display position from the head-up display 130 (S130). That is, the head-up display 130 provides the image display position (height) set according to a request of the controller 150 to the controller 150.

The controller 150 corrects the position of the control object in the HUD image using the detected eye position of the user and the obtained image display position (S140). The controller 150 determines the correction amount based on the detected eye position of the user and the obtained image display position with reference to the look-up table. The controller 150 corrects the coordinates of the control object based on the determined correction amount.

Then, the controller 150 repeatedly performs operations S120 to S140 at every predetermined cycle (e.g., 1 second, 10 seconds, or every time the virtual touch input occurs).

In addition, when the user's virtual touch input occurs, the controller 150 recognizes the positions (spatial coordinates) of the center position of the user's eye and the end position of the user's finger through the gesture recognizer 110. The controller 150 calculates the virtual touch position using the recognized positions (spatial coordinates) of the center position of the user's eye and the end position of the user's finger and determines that the calculated virtual touch position matches the corrected position of the control object. When the calculated virtual touch position matches the corrected position of the control object, the controller 150 performs the function assigned to the corresponding control object.

Figure 7:
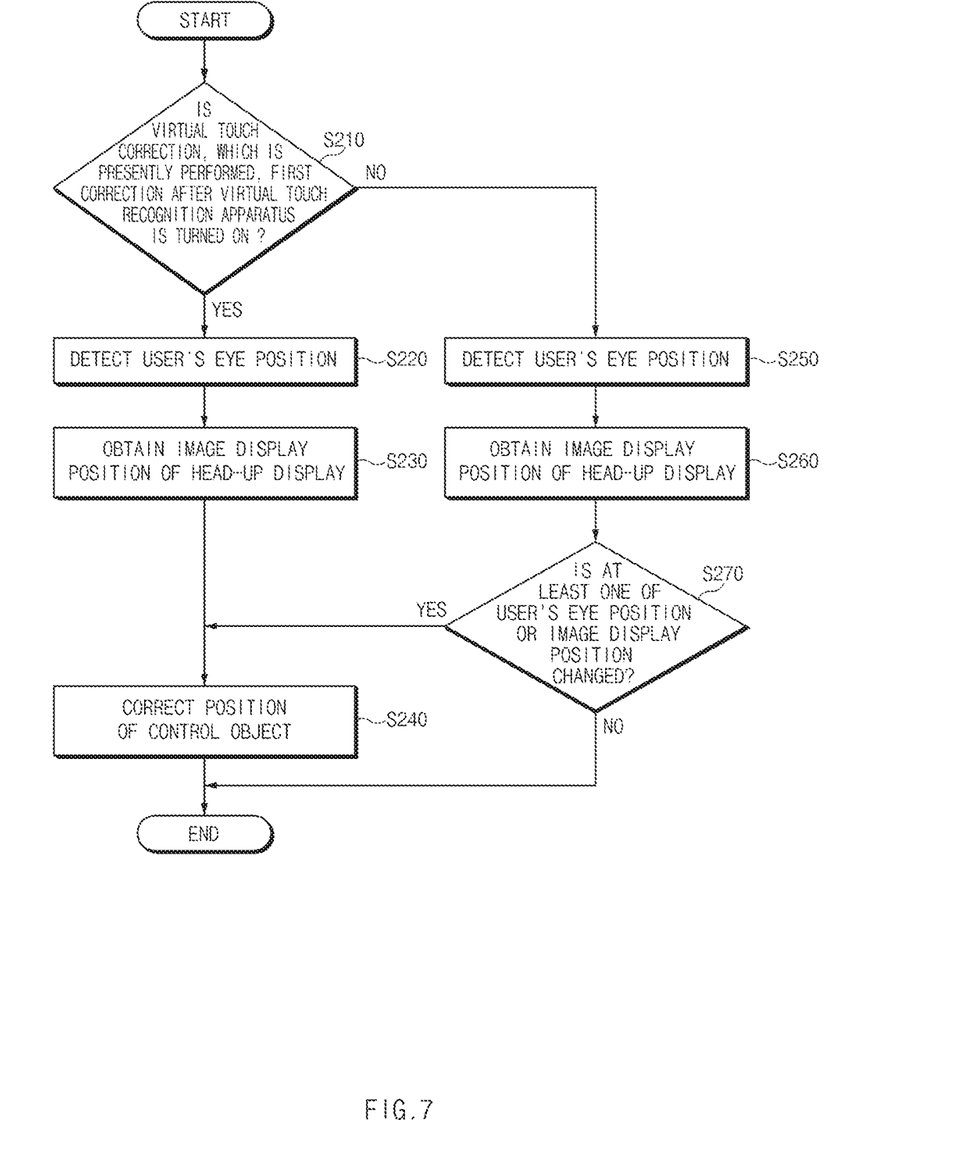
FIG. 7 is a flowchart showing a method for correcting a recognition error of a virtual touch recognition apparatus according to another exemplary embodiment of the present disclosure.

FIG. 7 is a flowchart showing a method for correcting a recognition error of a virtual touch recognition apparatus according to another exemplary embodiment of the present disclosure.

First, the controller 150 of the virtual touch recognition apparatus 100 identifies whether the virtual touch correction presently performed is the first correction after the virtual touch recognition apparatus 100 is turned on (S210). The controller 150 turns on the virtual touch recognition apparatus 100 in response to the user's input provided through the user interface 120 and identifies whether the virtual touch correction presently performed is the first correction after the virtual touch recognition apparatus 100 is turned on.

When the virtual touch correction presently performed is the first correction after the virtual touch recognition apparatus 100 is turned on, the controller 150 detects the eye position of the user through the gesture recognizer 110 (S220). That is, the gesture recognizer 110 obtains the user image through the image camera 111 and calculates the spatial coordinates of the center position of the eye of the user from the obtained image by using the spatial coordinate calculator 112.

Then, the controller 150 obtains the present image display position from the head-up display 130 (S230). The controller 150 firstly corrects the position of the control object in the HUD image using the detected eye position of the user and the obtained image display position (S240). The controller 150 determines the correction amount based on the detected eye position of the user and the obtained image display position with reference to the look-up table stored in the memory 140. The controller 150 corrects the position of the control object based on the determined correction amount.

Meanwhile, when the virtual touch correction presently performed is not the first correction after the virtual touch recognition apparatus 100 is turned on in operation S210, the controller 150 detects the eye position of the user through the gesture recognizer 110 (S250). In other words, when the virtual touch correction presently performed is not the first correction after the virtual touch recognition apparatus 100 is turned on, the controller 150 calculates the spatial coordinates of the center position of the eye of the user through the gesture recognizer 110.

The controller 150 obtains the present image display position from the head-up display 130 (S260). For instance, the controller 150 calculates a vertical distance (the image display height of the head-up display) in which the image projected by the head-up display 130 is spaced apart from the reference coordinates in the height direction of the vehicle.

The controller 150 identifies whether at least one of the eye position or the image display position is changed (S270). The controller 150 compares the detected eye position and the obtained image display position with previously-detected eye position and previously-obtained image display position to identify whether the eye position and the image display position are changed.

In a case in which at least one of the eye position or the image display position is changed, the controller 150 corrects the position of the control object with reference to the look-up table (S240). The controller 150 identifies the correction amount depending on the detected eye position and the obtained image display position through the look-up table and corrects the position of the control object.

Then, the controller 150 repeatedly performs the above-mentioned correction process at every predetermined cycle (e.g., 1 second, 10 seconds, or every time the virtual touch input occurs).

In addition, when the user's virtual touch input occurs, the controller 150 recognizes the positions (spatial coordinates) of the center position of the user's eye and the end position of the user's finger through the gesture recognizer 110. The controller 150 calculates the virtual touch position using the recognized positions (spatial coordinates) of the center position of the user's eye and the end position of the user's finger and determines that the calculated virtual touch position matches the corrected position of the control object. When the calculated virtual touch position matches the corrected position of the control object, the controller 150 performs the function (operation) assigned to the corresponding control object.

Figure 8:
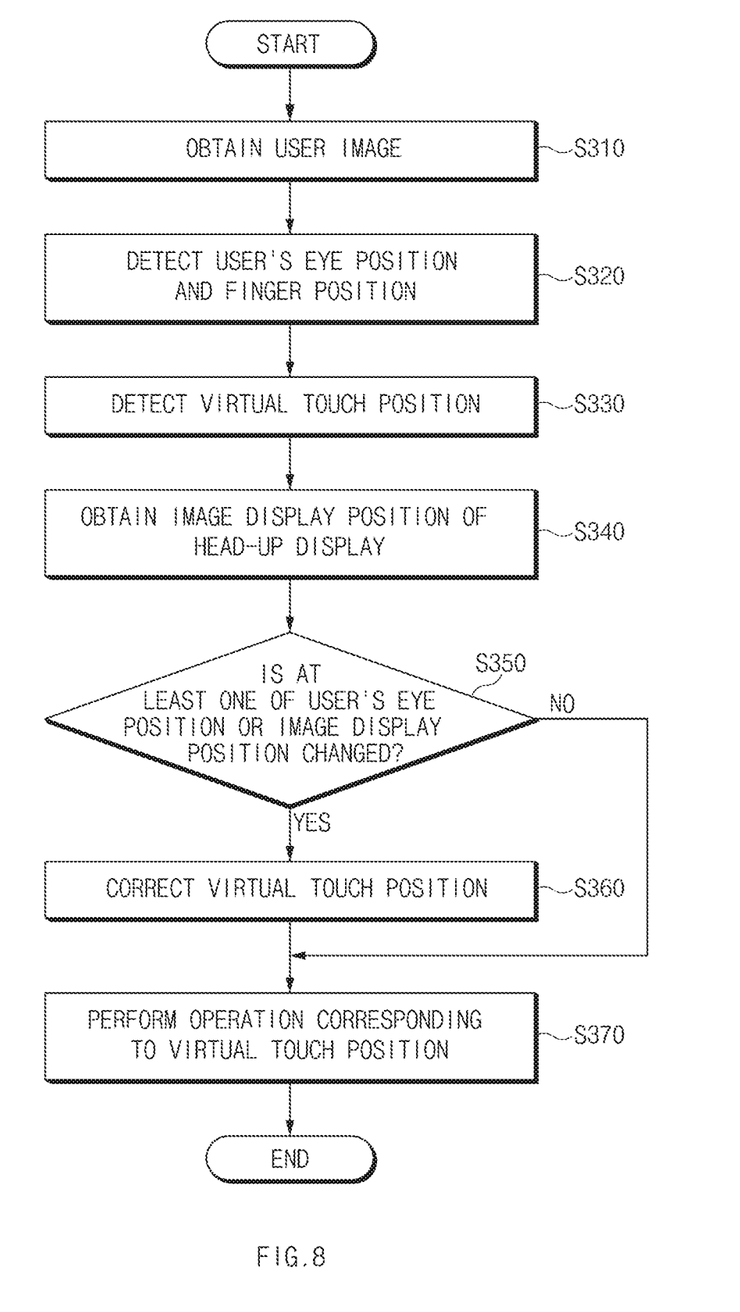
FIG. 8 is a flowchart showing a method for correcting a recognition error of a virtual touch recognition apparatus according to another exemplary embodiment of the present disclosure.

FIG. 8 is a flowchart showing a method for correcting a recognition error of a virtual touch recognition apparatus according to another exemplary embodiment of the present disclosure.

First, the gesture recognizer 110 of the virtual touch recognition apparatus 100 obtains the user image through the image camera 111 in response to the control of the controller 150 (S310).

The gesture recognizer 110 analyzes the obtained user image to detect the user's eye position and the user's finger position (S320). The spatial coordinate calculator 112 of the gesture recognizer 110 calculates the spatial coordinates of the center position of the user's eye and the spatial coordinates of the end position of the user's finger using the user image.

The controller 150 of the virtual touch recognition apparatus 100 calculates the virtual touch position using the eye position and the finger position, which are detected by the gesture recognizer 110 (S330). The controller 150 calculates the contact point at which the straight line (extension line) connecting the spatial coordinates of the center position of the user's eye to the spatial coordinates of the end position of the user's finger makes contact with the display surface (reflective surface or projection surface) on which the virtual image projected on the windshield W is displayed as the virtual touch position.

The controller 150 obtains the image display position from the head-up display 130 (S340).

The controller 150 identifies whether at least one of the eye position or the image display position is changed (S350). The controller 150 compares the detected eye position and the obtained image display position with the previously-detected eye position and the previously-obtained image display position or compares the detected eye position and the obtained image display position with the reference eye position and the reference image display position to identify whether the eye position and the image display position are changed.

In a case in which at least one of the eye position or the image display position is changed, the controller 150 corrects the calculated virtual touch position with reference to the look-up table stored in the memory 140 (S360).

The controller 150 performs an operation (function) corresponding to the corrected virtual touch position (S370). For instance, the controller 150 recognizes the control object corresponding to the corrected virtual touch position and performs the specific function assigned to the recognized control object.

Meanwhile, in a case in which the eye position or the image display position is not changed in operation S350, the controller 150 performs an operation corresponding to the calculated virtual touch position (S370).

What is claimed is:

1. A virtual touch recognition apparatus, comprising:
   a gesture recognizer configured to detect an eye position of a user using a camera;
   a head-up display configured to project an image on an image display position in front of the user; and
   a processor configured to correct a recognition error of a virtual touch based on the eye position of the user and the image display position,
   wherein the processor is configured to correct the recognition error by correcting coordinates of a control object in the image projected by the head-up display,
   wherein the processor is configured to determine a correction amount depending on the eye position and a present image display position of the image display position with reference to a look-up table stored in a memory, and
   wherein the look-up table includes correction values in a height direction and/or a width direction of the vehicle depending on a driver's eye height and a display height of the present image with respect to a reference eye height and a reference image display height and/or a driver's eye width and a display width of the present image with respect to a reference eye width and a reference image display width.

2. The virtual touch recognition apparatus of claim 1, wherein the head-up display is configured to:
   project the image on a windshield of a vehicle, which is located in front of the user.

3. The virtual touch recognition apparatus of claim 1, wherein the gesture recognizer comprises:
   the camera, wherein the camera is an image camera configured to take an image of the user; and
   a spatial coordinate calculator configured to analyze the image obtained by the image camera and calculate the eye position of the user and a finger position of the user.

4. The virtual touch recognition apparatus of claim 3, wherein the image camera is implemented by a three-dimensional camera.

5. The virtual touch recognition apparatus of claim 3, wherein the spatial coordinate calculator is configured to:
   calculate spatial coordinates of a center position of the user's eye and spatial coordinates of an end position of the user's finger with respect to a center of a front wheel of the vehicle.

6. The virtual touch recognition apparatus of claim 3, wherein the processor is configured to:
   calculate a virtual touch position based on the eye position of the user and the finger position of the user, which are output from the gesture recognizer.

7. The virtual touch recognition apparatus of claim 1, wherein the control object is a graphic object assigned with a specific function.

8. The virtual touch recognition apparatus of claim 1, wherein the processor is configured to:
   re-correct the coordinates of the control object with reference to the look-up table when at least one of the eye position of the user or the image display position is changed after the coordinates of the control object are corrected.

9. A method of correcting a recognition error of a virtual touch recognition apparatus, the method comprising:
   detecting an eye position of a user using an image camera;
   obtaining a position of an image projected in front of the user from a head-up display; and
   correcting a recognition error of a virtual touch based on the eye position and the position of the projected image,
   wherein the correcting of the recognition error of the virtual touch comprises correcting a position of a control object in the projected image,
   wherein the processor is configured to determine a correction amount depending on the eye position and a present image display position of the image display position with reference to a look-up table stored in a memory, and
   wherein the look-up table includes correction values in a height direction and/or a width direction of the vehicle depending on a driver's eye height and a display height of the present image with respect to a reference eye height and a reference image display height and/or a driver's eye width and a display width of the present image with respect to a reference eye width and a reference image display width.

10. The method of claim 9, wherein the head-up display is configured to:
    project the image on a windshield of a vehicle, which is located in front of the user.

11. The method of claim 9, wherein the detecting of the eye position of the user comprises:
    obtaining a user image through the image camera, wherein the image camera is a three-dimensional camera; and
    analyzing the obtained user image to calculate spatial coordinates of a center position of the eye of the user.

12. The method of claim 11, wherein the detecting of the eye position of the user comprises:
    calculating the spatial coordinates of the center position of the eye of the user using a three-dimensional coordinate calculation method.

13. The method of claim 11, wherein the detecting of the eye position of the user comprises:

calculating the spatial coordinates of the center position of the eye of the user with respect to a center of a front wheel of the vehicle.

14. The method of claim 11, wherein the detecting of the eye position of the user comprises:
calculating spatial coordinates of an end position of a finger of the user using the obtained user image.

15. The method of claim 9, wherein the control object is implemented by a graphic object assigned with a specific function.

16. The method of claim 9, further comprising re-correcting the position of the control object with reference to a look-up table when at least one of the eye position of the user or the position of the projected image is changed after the recognition error of the virtual touch is corrected.

* * * * *